US008261608B2

(12) United States Patent
Schoen

(10) Patent No.: US 8,261,608 B2
(45) Date of Patent: Sep. 11, 2012

(54) SOLAR PROTECTION INSTALLATION EQUIPPED WITH A WIND SENSOR

(75) Inventor: Jan Hendrik Schoen, Bergen (NO)

(73) Assignee: Somfy SAS, Cluses (FR)

( * ) Notice: Subject to any disclaimer, the term of this patent is extended or adjusted under 35 U.S.C. 154(b) by 109 days.

(21) Appl. No.: 12/734,203

(22) PCT Filed: Oct. 10, 2008

(86) PCT No.: PCT/EP2008/008566

§ 371 (c)(1), (2), (4) Date: Jul. 7, 2010

(87) PCT Pub. No.: WO2009/049827

PCT Pub. Date: Apr. 23, 2009

(65) Prior Publication Data

US 2010/0305760 A1 Dec. 2, 2010

(30) Foreign Application Priority Data

Oct. 19, 2007 (FR) ..................................... 07 58434

(51) Int. Cl.
*G01W 1/00* (2006.01)
*E05F 15/20* (2006.01)

(52) U.S. Cl. .............................. 73/170.01; 160/3; 160/5

(58) Field of Classification Search ................ 73/170.01
See application file for complete search history.

(56) References Cited

U.S. PATENT DOCUMENTS

| | | | | |
|---|---|---|---|---|
| 5,225,748 | A | 7/1993 | Haring | |
| 6,732,018 | B2 * | 5/2004 | Osinga | 700/275 |
| 2001/0027846 | A1 * | 10/2001 | Osinga | 160/70 |
| 2007/0240831 | A1 * | 10/2007 | Tran | 160/67 |
| 2009/0139663 | A1 * | 6/2009 | Cutler | 160/3 |
| 2010/0252208 | A1 * | 10/2010 | Svirsky et al. | 160/61 |
| 2010/0332034 | A1 * | 12/2010 | Bergeson et al. | 700/275 |
| 2011/0198041 | A1 * | 8/2011 | Svirsky et al. | 160/61 |
| 2011/0220299 | A1 * | 9/2011 | Berman et al. | 160/5 |
| 2011/0265956 | A1 * | 11/2011 | Cavarec et al. | 160/1 |

FOREIGN PATENT DOCUMENTS

| | | |
|---|---|---|
| DE | 40 09 373 | 9/1991 |
| DE | 200 00 681 | 3/2000 |
| DE | 102 04 469 | 8/2003 |
| EP | 1 069 257 | 1/2001 |
| EP | 1 069 275 | 1/2001 |
| EP | 1 077 378 | 2/2001 |
| EP | 1 365 083 | 11/2003 |
| FR | 2 797 294 | 2/2001 |
| WO | WO 03/046328 | 6/2003 |

OTHER PUBLICATIONS

International Search Report, Apr. 23, 2009.

* cited by examiner

*Primary Examiner* — Andre Allen
(74) *Attorney, Agent, or Firm* — Collard & Roe, P.C.

(57) ABSTRACT

The invention relates to a solar protection installation (1) comprising at least one mobile window blind (2), at least one drive means (3), at least one control unit (4), and at least one wind sensor (5). The wind sensor (5) is used to detect overload caused by the wind on the window blind, by the detection of variations in tension and/or pressure leading to deformations of the window blind. The wind sensor is provided on and/or in the window blind (2).

15 Claims, 3 Drawing Sheets

SOLAR PROTECTION INSTALLATION EQUIPPED WITH A WIND SENSOR

CROSS REFERENCE TO RELATED APPLICATIONS

Figure 1:
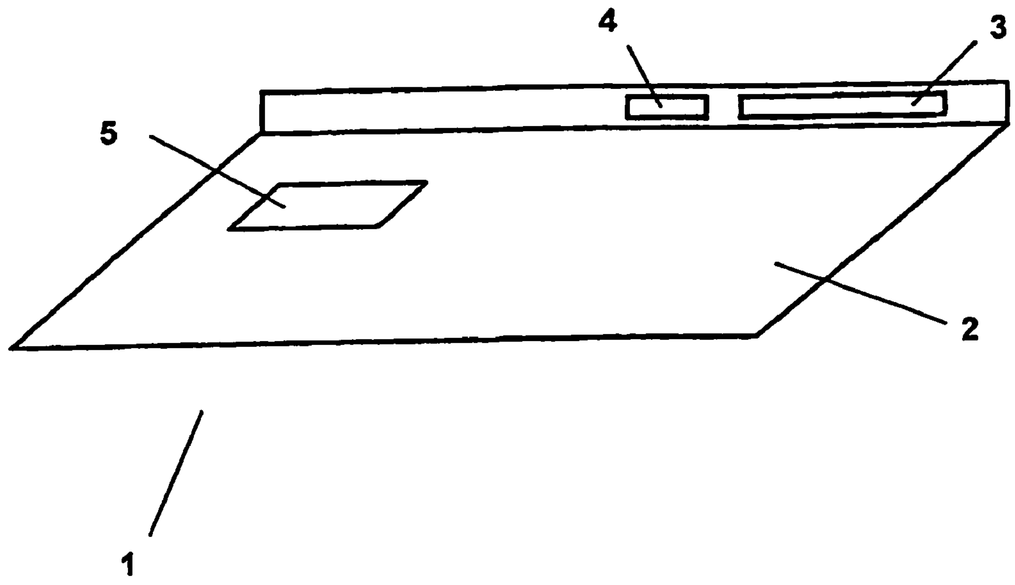

This application is the National Stage of PCT/EP2008/008566 filed on Oct. 10, 2008, which claims priority under 35 U.S.C. §119 of French Application No. 0758434 filed on Oct. 19, 2007. The international application under PCT article 21(2) was not published in English.

FIELD OF THE INVENTION

The present invention relates to a solar protection installation comprising at least one movable shade cloth, at least one means for driving the shade cloth, at least one control unit and at least one wind sensor.

The invention also relates to a wind sensor intended for a solar protection installation.

PRIOR ART

It is known to operate solar protection installations with a shade cloth controlled by an electric motor, as a function of the current presence of wind. If the speed of the wind exceeds a certain threshold, the drive means of the solar protection installation is activated to retract the shade cloth. In this way, the installation is protected from damage that the wind might cause. By way of example, document DE 40 09 373 A1 describes a solar protection installation of this type according to which the time of use is furthermore optimised by a retracted position which is dependent on the intensity of the wind.

In many cases, a conventional anemometer which has a plurality of vanes and is intended to be installed on the roof of a building is used to record the intensity of the wind. The drawback of this solution is that the recorded intensity of the wind is not necessarily that at the site of the solar protection installation. That can cause damage in the solar protection installation or limit the service life thereof.

Various devices have already been proposed consisting in directly measuring the effects of the wind at the site of the solar protection installation. For example, document EP 1 365 083 A2 describes a solar protection installation, the oscillations of which and/or the vibrations of the, flat, integral protection means are transmitted to the rotor of the motor in order to allow the intensity of the wind to be measured in this way.

Document FR 2 797 294 A1 proposes a solar protection installation equipped with a vibration sensor. The sensor is fixed to the mount or to the support of the solar protection installation and it detects the vibrations of the shade cloth caused by the effects of the wind. Document EP 1 069 257 A2 also describes a solar protection installation with a sensor control, comprising a vibration or acceleration sensor such as a sensor for effects of the wind. The sensor is integrated into the articulated arm of a shade. Document EP 1 077 378 A1 also describes a solar protection installation equipped with a wind sensor for recording vibrations; a reference body exposed to the wind will be energised by vibrations which will be sensed. In this case too, the sensor is provided on the support for fixing the solar protection installation.

Such recording of the intensity of the wind in the region of the motor or the support of a solar protection installation does not always provide satisfactory results. The main drawback is the fact that these mountings of the sensor are not suitable for all types of protection installation and the sensor is not necessarily effectively integrated into the installation.

OBJECT OF THE INVENTION

The object of the present invention is to develop a solar protection installation equipped with a wind sensor allowing the effects of the wind to be reliably recorded at the location of the solar protection installation. Furthermore, the wind sensor must be able to be applied to various types of solar protections, in particular solar protections made of textile materials, and to be integrated easily, without necessitating large design means, into the solar protection installations.

ACCOUNT AND ADVANTAGES OF THE INVENTION

For this purpose, the invention relates to a solar protection installation with at least one shade cloth of the type defined hereinbefore, such that the sensor, known as the wind overload sensor, is a sensor of the overload due to the wind on the shade cloth and provided on and/or in the shade cloth.

The invention also relates to a wind sensor of the type defined hereinbefore, such that the sensor, known as the wind overload sensor, is a sensor of the overload due to the wind on the shade cloth and provided to be installed on and/or in the shade cloth of the solar protection installation.

The solar protection installation according to the invention is equipped with at least one shade cloth, in particular with a textile shade cloth which is moved using a drive means. The drive means used is preferably an electric drive and/or an electric motor. The solar protection installation further comprises at least one control unit and at least one sensor known as the wind overload sensor. The position of the solar protection shade cloth is adapted with the aid of the control unit in accordance with the signal provided by the wind overload sensor, preferably by an automatic adaptation while totally or partially extending or retracting the shade cloth. Beside the automatic adaptation of the position of the solar protection shade cloth as a response to the signal from the wind overload sensor, it is also possible to have a position adaptation by a manual drive following the triggering of an appropriate signal, for example an optical or acoustic signal.

The overload sensor is provided to directly detect variations in tension and/or in pressure caused by deformations of the shade cloth. The wind sensor, in particular, is provided to sense a tension or an elongation of the shade cloth. This involves recording the mechanical properties or the mechanical deformations of the shade cloth. If, for example, the wind rises and lifts up the cloth of the solar protection installation, that causes variations in tension and/or in pressure that are applied to the shade cloth and that the wind overload sensor or the measuring means detects.

The wind overload sensor may be a certain part of the shade cloth or a separate component installed on the cloth. The solar protection installation according to the invention has the advantage of recording the effects of the wind directly in overload form at the site of the solar protection and directly on the cloth. The wind overload protector may also easily be integrated into various solar protection installations in a manner broadly independent of the design of the installation.

The solar protection installation according to the invention comprises various types of solar protections, in particular solar protections made of textile material. This expression designates inter alia installations creating shadows or similar installations. Examples are terraced solar protection installations (cartridge shades, canopy shades), vertical shades, facade shades, slatted folding shades, winter garden shades, billowing balloon shades, pleated shades and marquisolette shades.

According to a preferential embodiment of the solar protection installation of the invention, the wind overload sensor comprises a measuring means for recording the overload of the wind, this means being mechanically flexible and in particular supple.

Advantageously, the measuring means rolls up and rolls down with the shade cloth in order to extend or retract. According to a preferential embodiment, the wind overload sensor, and in particular the wind overload sensor with the measuring means, is mechanically flexible and preferably supple and it extends and retracts advantageously with the cloth.

The measuring means of the wind overload sensor converts the wind overload applied to the cloth by an electrical signal in order to detect variation in an electrical variable, in particular. Examples of electrical variables of this type include electrical resistance, electrical impedance, electrical capacity or electrical voltages.

According to a preferential embodiment of the solar protection installation according to the invention, the measuring means for recording the overload of the wind is in the form of a textile fabric and/or of fibres. According to a preferential embodiment, the sensor or the measuring means uses a fabric or impregnated or coated fibres.

By way of example, the measuring means is an elongation sensor using coated fabrics or fibres. A variation in electrical resistance can be detected with the aid of coated fabrics or fibres. For that purpose, it is for example possible to record elongation by fibres covered with polypyrrole or with carbon-filled rubber.

According to other embodiments, the measuring means used are metallised fabrics and/or metallised fibres, the electrical resistance of which can be measured as a measure of the deformation of the cloth, in particular as a measure of the elongation of the cloth. Preferably, metallic threads can be used for this purpose. Beside electrical resistance, other properties of the measuring means, in particular other electrical properties, can be used to record the overload due to the wind.

According to a particularly advantageous embodiment, the measuring means for recording the overload due to the wind consists of piezoresistant fibres. The piezoresistant signal allows the pressure applied to the cloth, for example, to be measured, allowing the overload due to the wind to be determined. Other examples of measuring means for recording pressure are conductive elastomers. Furthermore, the person skilled in the art will find other materials suitable as measuring means.

Preferably, the measuring means for recording the overload due to the wind is integrated into the fabric of the shade or into the cloth of the shade and/or into the wind overload sensor, for example by being woven thereto. According to other embodiments, the measuring means is applied to the cloth and/or to the wind overload sensor which is for example stitched, adhesively bonded or fixed using other unknown methods. The measuring means for recording the overload due to the wind can be produced for example in the form of woven strips or of fibre bundles placed on the wind overload sensor or integrated directly therein. That offers a particular advantage for the solar protection installation according to the invention as the direct installation of the measuring means for recording the overload due to the wind and/or in the shade cloth of the solar protection installation allows the measuring means and thus the wind overload sensor to be used in a very flexible manner.

In particular, the wind overload sensor or the measuring means can be used directly in the manufacture of the solar protection installation as components of the shade cloth and, in particular, the measuring means or the wind overload sensor can be integrated into the cloth. According to other advantageous embodiments, the wind overload sensor can be used to equip or transform existing solar protection installations. The wind overload sensor can be installed on the existing shade cloth.

According to a particularly advantageous embodiment of the solar protection installation according to the invention, the wind overload sensor comprises a plurality of measuring means for recording the overload due to the wind. Thus, in a particularly advantageous manner, there will be provided a precise and reliable recording of the overload of the wind that is applied to the shade cloth of the solar protection installation. Measuring means can be provided, for example a plurality of strips on a wind overload sensor. Particularly preferably, the measuring means can be installed with a different orientation or in different directions on the wind overload sensor.

Moreover, it is particularly advantageous to install a plurality of wind overload sensors on the shade cloth of the solar protection installation. Thus, a plurality of wind overload sensors are preferably installed or integrated at different points of the shade cloth in order thus to record in an optimum manner the overload of the wind that is applied to the solar protection installation. Preferably, the wind overload sensors are installed at points of the cloth where maximum wind energisation is provided.

The multiplicity of the measuring means on the wind overload sensor or the multiplicity of the wind overload sensors on the cloth can operate in each case as a network of wind overload measuring means or sensors or individually and the information can be taken into account in a corresponding manner for the subsequent data processing and the control of the solar protection installation. An appropriate combination of the signals thus allows the overload due to the wind to be recorded in an optimum manner.

When the shade cloth of the solar protection installation according to the invention is rolled up or is completely retracted, the wind overload sensor, and thus the measuring means, is completely rolled up or covered and it is generally no longer possible to record the overload due to the wind. Conversely, when the shade cloth is completely extended, the sensor, and thus the means for recording the overload due to the wind, is completely released and is ready to record the overload due to the wind. According to the invention, provision may be made to record the overload due to the wind only when the cloth is completely extended. According to a particularly advantageous embodiment, provision is made for the wind overload sensor or sensors also to be ready to record the overload due to the wind if the cloth is at least in part retracted. That can be achieved by an appropriate spatial arrangement of the wind overload sensors or of the measuring means on the shade cloth so that the wind overload sensors or the measuring means are released even when the cloth is partially retracted. That allows the overload of the wind exerted on the cloth which is extended only partially to be recorded and maximum use thus to be made of the solar protection installation.

According to a preferential embodiment of the solar protection installation according to the invention, the installation is designed so that the overload due to the wind is recorded only when the shade cloth is out of operation, that is to say when the cloth is retracted or extended or partially retracted or partially extended. According to another particularly advantageous embodiment, the solar protection installation can also record the overload due to the wind by the wind overload sensor if the drive means is operative and is retracting or extending the shade cloth. Corresponding devices and mountings of the installation for carrying out these embodiments are dependent on the person skilled in the art.

According to a particularly advantageous embodiment of the solar protection installation according to the invention, the wind overload sensor is equipped, not only with the means for recording the overload due to the wind, but also with a device for recording and/or processing measurement values. This device allows the data obtained to be operated on and transmitted to the control of the drive means of the solar protection installation in order in this way to adjust the position of the shade cloth as a function of the overload due to the wind. Beside the location or the orientation in the region of the wind overload sensors, according to another embodiment, provision may be made for this device for recording and/or for processing measurement values to be at a different site of the solar protection installation, for example in the region of the drive means and/or of the control unit. The device for recording and/or for processing measurement values can also be provided beside or, in a variant of the integration or of the installation in the shade cloth, also in the frame parts and/or in the profile of the solar protection installation.

In the preferential embodiments of the solar protection installation according to the invention, the wind overload sensor comprises at least one energy supply means, at least one data processing means and/or at least one data communication means. The means, taken in isolation or together, can also be mechanically fixed in order to allow them to be retracted or extended with the shade cloth. These means are preferably provided in the device for recording and/or for processing the measurement values.

The energy supply means can for example be connected to the electrical distribution network. Moreover, it is possible for electricity to be supplied by the control unit and/or by the electrical drive of the solar protection installation. A cabled connection can be provided for the supply of electricity. According to a particularly advantageous embodiment, a cabled connection is not provided for the supply. For example, thin, flexible and supple solar cells or batteries can be used as energy supply means. The person skilled in the art will be able to use other methods, in particular electromechanical methods, for supplying energy to the sensors according to the invention.

The data processing means is used to record the detected measurement values, to operate on them and to convert them into signals or into instructions which are transmitted to the control unit and/or to the electrical drive means. The data processing means is preferably an electronic circuit. Particularly advantageously, this circuit is installed on the shade cloth or integrated therein and, in particular, the data processing means are manufactured using a screen printing process. That allows use in this way to be made of supple printed circuits based on oligomers, on polymers and/or on inorganic semiconductors.

The values or the data obtained in the wind overload sensor are advantageously transmitted by data communication. The communication can be carried out by wire connection. Particularly advantageously, the communication is carried out wirelessly. Moreover, the data can be communicated unidirectionally or bidirectionally. Preferably, the communication is carried out by high-frequency signals and the data communication means is advantageously embodied as a high-frequency emitter. According to a particularly advantageous embodiment, the data communication means comprises a planar and preferably textile antenna.

The installation of one or more energy supply means, for processing the data and/or for communicating the data on the wind overload sensor, in particular in the device for recording and/or for processing measurement values, has the advantage of developing in this way a wind overload sensor with all the necessary components forming a unit used in the solar protection installation. That allows individual account to be taken inter alia, by an appropriate arrangement of wind overload sensors of this type on the solar protection shade cloth, of the requirements relating to a solar protection installation from the point of view of the predictable overload due to the wind. Furthermore, the existing solar protection installations can be individually equipped with corresponding wind overload sensors.

According to a particularly advantageous embodiment, the solar protection installation is provided for comparing the measurements or the data recorded by the wind overload sensor to another set of data, in particular a set of reference data. This set of data can be registered for example during a phase known as the learning phase or a start-up phase of the solar protection installation at the respective location. It is for example possible to regularly update this set of data. A compensation with this set of data allows thresholds to be set that fix the response of the installation to a certain wind overload. That has the advantage of allowing the solar protection installation to be adjusted in accordance with certain environmental conditions.

According to another preferential embodiment of the solar protection installation according to the invention, the wind overload sensor is also equipped with a protection against electrostatic charges. This rules out the risk of the sensor becoming damaged by triboelectricity, in particular during retraction and extension movements of the shade cloth.

According to other preferential embodiments of the solar protection installation according to the invention, the installation, and in particular the wind overload sensor, may be associated with one or more other measuring means for recording other external parameters. Examples of the appropriate parameters are temperature, precipitations, humidity and/or brightness. The appropriate measuring means for recording these parameters are within the grasp of the person skilled in the art. For recording and taking account of other parameters, and also for pooling measuring, connection or supply means, it is possible to adapt and thus optimise the operation of the solar protection installation according to the invention to the environmental conditions in a particularly advantageous manner.

According to an advantageous embodiment, the solar protection installation according to the invention comprises a sensor associated with a shade cloth designed to generate, recover and/or convert energy into electricity, for example by integrating photovoltaic cells into the shade cloth. The use of common connection means allows, in particular, the implementation and the installation of a sensor of this type to be optimised.

Furthermore, the invention includes a wind overload sensor to be used with a solar protection installation having at least one movable shade cloth, at least one drive means and at least one control unit. The wind overload sensor is provided to be installed on and/or in the shade cloth of the solar protection installation and is provided to detect variations in tension and/or in pressure caused by deformations of the shade cloth.

For other characteristics of the wind overload sensor according to the invention, reference may be made to the foregoing description.

DRAWINGS

Figure 2:
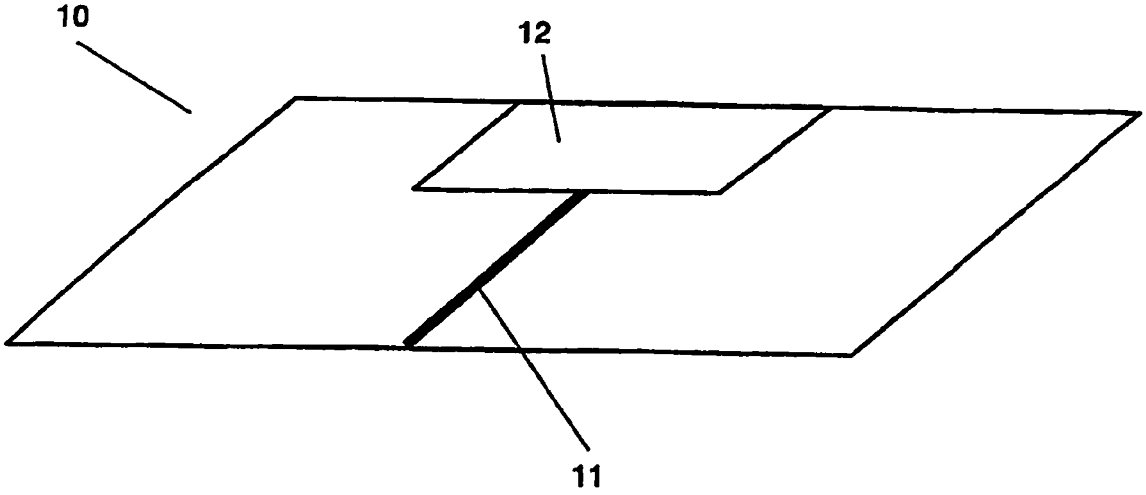
Figure 3:
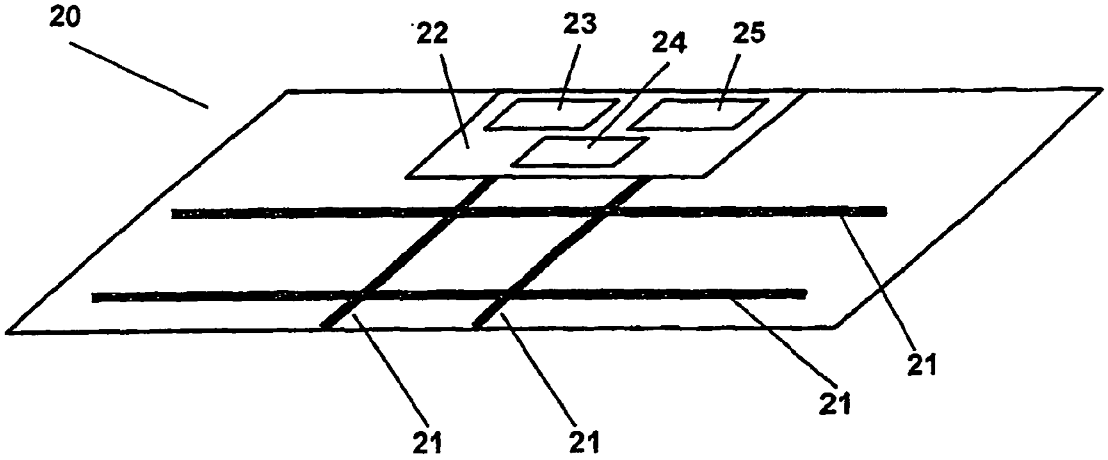

The present invention will be described hereinafter in greater detail with the aid of exemplary embodiments represented in the appended drawings, in which:

FIG. 1: is a schematic view of a solar protection installation according to the invention;

FIG. 2: is a schematic view of a wind overload sensor of a solar protection installation according to the invention; and FIG. 3: is a schematic view of another embodiment of a wind overload sensor of a solar protection installation according to the invention.

DETAILED DESCRIPTION OF THE EMBODIMENT

FIG. 1 shows a solar protection installation 1 according to the invention having a solar protection shade cloth 2, the position of which is adjustable. The solar protection installation 1 is equipped with a drive means 3 and with a control unit 4. Furthermore, a wind overload sensor 5 is provided on the surface of the shade cloth 2. The drive means 3, which consists for example of an electric motor, is activated by the control unit 4 and performs the retraction or extension movement of the cloth 2. The overload of the wind that is applied to the shade cloth 2 is recorded with the aid of the wind overload sensor 5. The signal is transmitted to the control unit 4 which regulates the position of the shade cloth 2 as a function of the overload due to the wind via the drive means 3. According to another embodiment, the control unit can be integrated into the drive means. According to another embodiment, the control unit is provided in the region of the wind overload sensor or preferably integrated into the wind overload sensor.

The wind overload sensor 10 according to FIG. 2 comprises a measuring means 11 for recording the overload due to the wind; in this embodiment, this measuring means consists of a narrow strip. The wind overload sensor according to FIG. 2 further comprises a device 12 for recording and/or processing the measurement values. The data provided by the measuring means 11 can be operated on, processed and/or transmitted to the control unit and/or to the drive means with the aid of this device 12. FIG. 3 shows another preferential embodiment of the wind overload sensor 20. The wind overload sensor 20 comprises a plurality of measuring means 21 in the form of narrow bands installed at different orientations. The device 22 for recording and/or for processing the measurement values comprises a means 23 for supplying energy, a means 24 for processing data, and a means 25 for communicating data. These means 23, 24, 25 supply the wind overload sensor with energy and also process the data and transmit the data to the control unit and/or drive means of the solar protection installation.

The invention claimed is:

1. Solar protection installation (1) comprising at least one movable shade cloth (2), at least one drive means (3), at least one control unit (4) and at least one wind sensor (5), characterised in that the sensor, known as the wind overload sensor (5), is a sensor of overload due to the wind on the shade cloth detecting variations in tension and/or in pressure caused by deformations of the shade cloth and in that it is provided on and/or in the shade cloth (2).

2. Installation according to claim 1, characterised in that the wind sensor is provided to record a tension, in particular a mechanical tension and/or an elongation of the shade cloth (2).

3. Solar protection installation according to claim 1 or claim 2, characterised in that the wind sensor comprises at least one mechanically flexible, in particular supple, measuring means (11) for recording the overload of the wind and preferably the measuring means (11) can retract and extend with the shade cloth (2).

4. Installation according to claim 3, characterised in that the measuring means (11) comprises at least one textile fabric and/or, preferably coated, fibres.

5. Installation according to claim 3 or claim 4, characterised in that the measuring means (11) comprises at least one metallised fabric and/or metallised fibres and/or fibres made of metal.

6. Installation according to one of claims 3 to 5, characterised in that the wind sensor (5) comprises a plurality of measuring means (11).

7. Installation according to one of the preceding claims, characterised in that it comprises a plurality of wind sensors (5).

8. Installation according to one of the preceding claims, characterised in that the wind sensor (5) comprises at least one device (12) for recording and/or processing measurement values.

9. Installation according to one of the preceding claims, characterised in that the wind sensor (5) comprises at least one energy supply means (23) and this energy supply means is mechanically flexible.

10. Installation according to one of the preceding claims, characterised in that the wind sensor (5) comprises at least one data processing means (24) which is mechanically flexible.

11. Installation according to one of the preceding claims, characterised in that the wind sensor (5) comprises at least one data communication means (25) which is mechanically flexible.

12. Installation according to one of the preceding claims, characterised in that the wind sensor (5) comprises at least one protection against electrostatic overloads.

13. Installation according to one of the preceding claims, characterised in that the shade cloth comprises at least one means for generating, recovering and/or converting energy and in that preferably the wind sensor and the means for generating, recovering and/or converting energy are at least in part common.

14. Wind sensor intended for a solar protection installation comprising at least one movable shade cloth, at least one drive means and at least one control unit, characterised in that the sensor, known as the wind overload sensor, is a sensor of overload due to the wind on the shade cloth detecting variations in tension and/or in pressure caused by deformations of the shade cloth and in that it is provided to be placed on and/or in the shade cloth of the solar protection installation.

15. Wind sensor according to claim 14, characterised in that the wind sensor comprises at least one of the characteristics of claims 2 to 13.

* * * * *